US010982967B2

(12) United States Patent
Lugez et al.

(10) Patent No.: US 10,982,967 B2
(45) Date of Patent: Apr. 20, 2021

(54) METHOD AND DEVICE FOR FAST DETECTION OF REPETITIVE STRUCTURES IN THE IMAGE OF A ROAD SCENE

(71) Applicants: Continental Automotive France, Toulouse (FR); Continental Automotive GmbH, Hannover (DE)

(72) Inventors: Boris Lugez, Toulouse (FR); Lucien Garcia, Toulouse (FR); Arnaud Faure, Toulouse (FR)

(73) Assignees: Continental Automotive France; Continental Automotive GmbH

(*) Notice: Subject to any disclaimer, the term of this patent is extended or adjusted under 35 U.S.C. 154(b) by 31 days.

(21) Appl. No.: 16/455,928

(22) Filed: Jun. 28, 2019

(65) Prior Publication Data
US 2020/0003574 A1 Jan. 2, 2020

(30) Foreign Application Priority Data
Jun. 29, 2018 (FR) ...................................... 1855947

(51) Int. Cl.
*G01C 21/36* (2006.01)
*G06K 9/00* (2006.01)
(Continued)

(52) U.S. Cl.
CPC ..... *G01C 21/3602* (2013.01); *G06K 9/00791* (2013.01); *G06K 9/6202* (2013.01);
(Continued)

(58) Field of Classification Search
None
See application file for complete search history.

(56) References Cited

U.S. PATENT DOCUMENTS 6,504,569 B1 * 1/2003 Jasinschi ................. G06T 7/579
345/950
6,614,429 B1 * 9/2003 Zhang ..................... G06K 9/209
345/420
(Continued)

FOREIGN PATENT DOCUMENTS

EP 2431917 A1 3/2012

OTHER PUBLICATIONS

Diosi et al., "Experimental Evaluation of Autonomous Driving Based on Visual Memory and Image-Based Visual Servoing," IEEE Transactions on Intelligent Transportation Systems, vol. 12, No. 3, Sep. 2011 (Year: 2011).*
(Continued)

*Primary Examiner* — Soo Shin
(74) *Attorney, Agent, or Firm* — RatnerPrestia

(57) ABSTRACT

A method of processing images allowing the identification of at least one same point appearing on each image of a sequence of images, the sequence of images including a first image, a second image and a third image generated respectively at a first instant, a second instant, later than the first instant, and a third instant, later than the second instant, by a camera mounted in an automotive vehicle. The method includes detecting a plurality of identical points in each image of the sequence of images, relating to a plurality of repetitive patterns in each image of the sequence of images and of identification, in the second image and in the third image, of the identical points corresponding to the points in space for which the calculated depth is identical, these points in space representing respectively in the second image and the third image one and the same real point.

12 Claims, 7 Drawing Sheets

(51) Int. Cl.
  *G06K 9/62* (2006.01)
  *G06T 7/00* (2017.01)
  *G06T 7/246* (2017.01)
  *G06T 7/55* (2017.01)
  *G06T 7/73* (2017.01)

(52) U.S. Cl.
  CPC .................. *G06T 7/55* (2017.01); *G06T 7/73* (2017.01); *G06T 7/97* (2017.01); *G06T 2207/10016* (2013.01); *G06T 2207/30252* (2013.01)

(56) References Cited

U.S. PATENT DOCUMENTS

| | | | | |
|---|---|---|---|---|
| 7,286,689 | B2* | 10/2007 | Damera-Venkata | G06T 7/20 375/240.16 |
| 8,401,276 | B1* | 3/2013 | Choe | G06T 7/30 382/154 |
| 9,646,201 | B1* | 5/2017 | Horowitz | G06T 7/251 |
| 10,430,994 | B1* | 10/2019 | Baker | G06T 7/593 |
| 2011/0311104 | A1* | 12/2011 | Sinha | G06T 7/579 382/106 |
| 2017/0148168 | A1* | 5/2017 | Lindner | G06T 5/50 |
| 2020/0003574 | A1* | 1/2020 | Lugez | G06K 9/00798 |

OTHER PUBLICATIONS

Ellsöm et al., "Targetless calibration for vehicle mounted cameras in planar motion using visual odometry," Master's thesis, Department of Electrical Engineering, Chalmers University of Technology, Gothenburg, Sweden 2018 (Year: 2018).*
Kushnir et al., "Epipolar Geometry Estimation for Urban Scenes with Repetitive Structures", IEEE Transactions on Pattern Analysis and Machine Intelligence, 2014, vol. 36, No. 12, pp. 2381-2395.
Sur et al., "Image Point Correspondences and Repeated Patterns", Research Report, No. 7693, submitted Jul. 20, 2011, 53 pages.
Zabih et al., "Non-Parametric Local Transforms for Computing Visual Correspondence", LNCS, 1994, vol. 801, 8 pages.

* cited by examiner

METHOD AND DEVICE FOR FAST DETECTION OF REPETITIVE STRUCTURES IN THE IMAGE OF A ROAD SCENE

CROSS REFERENCE TO RELATED APPLICATIONS

This application claims priority to French Patent Application No. 1855947, filed Jun. 29, 2018, the contents of such application being incorporated by reference herein.

FIELD OF THE INVENTION

The invention pertains to the field of assisting the driving of an automotive vehicle and relates more particularly to a method and a device for processing images acquired by a camera of an automotive vehicle as well as to an automotive vehicle comprising such a device.

BACKGROUND OF THE INVENTION

Nowadays, it is known to equip an automotive vehicle with a driving assistance system commonly called ADAS (Advanced Driver Assistance System). Such a system comprises in a known manner a video camera, for example mounted on the front windshield of the vehicle, which makes it possible to generate a stream of images representing the environment of said vehicle. These images are utilized by an image processing device with the aim of assisting the driver, for example by detecting an obstacle or else the crossing of a white line. The information provided by the images acquired by the camera must therefore be sufficiently precise and relevant to allow the system to assist the driver in a reliable manner.

In particular, to utilize these images, it is necessary to track the optical flow of a certain number of points in the series of images. More precisely, this entails tracking the trajectory of these points in a sequence of images, that is to say in a plurality of successive images, and determining their location in space.

In order to track a point represented by a pixel of a first image in a second consecutive image, a known solution consists in analyzing a zone of pixels around said pixel in the second image so as to determine the direction in which the point moves between the first image and the second image.

However, this method of processing images exhibits a major drawback. Indeed, for a given point of an identical pattern which repeats several times on each image of a sequence of images, the method detects a plurality of similar signatures on one and the same so-called "epipolar" segment according to which the objects corresponding to these patterns are disposed, for example a plurality of posts of a safety barrier installed along a road. Stated otherwise, this method of processing images proposes several possible solutions for the location of one and the same point of a repetitive pattern in each image of the sequence of images. This being so, the information given to the driver relating to the distance between the object and the vehicle may turn out to be false, and this may present a risk in respect of the safety of the occupants of the vehicle.

SUMMARY OF THE INVENTION

The need therefore exists for a solution making it possible to at least partly remedy these drawbacks by resolving this type of ambiguity.

To this end, an aspect of the invention is a method of processing images allowing the identification of at least one same point appearing on each image of a sequence of images, said sequence of images comprising a first image, a second image and a third image generated respectively at a first instant, at a second instant, later than the first instant, and at a third instant, later than the second instant, by a camera mounted in an automotive vehicle, said method being noteworthy in that it comprises the steps of:

detection of a plurality of identical points in each image of the sequence of images relating to a plurality of repetitive patterns in each image of the sequence of images, for each identical point detected in the second image of the sequence of images, calculation of the depth at the first instant of the point in space corresponding to said identical point of the second image, for each identical point detected in the third image of the sequence of images, calculation of the depth at the first instant of the point in space corresponding to said identical point of the third image, identification, in the second image and in the third image, of the identical points corresponding to the points in space for which the calculated depth is identical, these points in space representing respectively in the second image and in the third image one and the same real point.

The method according to an aspect of the invention advantageously makes it possible to distinguish effectively and in a fast manner repetitive patterns appearing in each image of a sequence of images so as in particular to allow reliable assistance to the driver of the vehicle.

The method according to an aspect of the invention also makes it possible to resolve problems of ambiguity related to the presence of a repetitive structure and thus obtain correct depth information for these repetitive structures.

Preferably, the depth at the first instant of the point in space corresponding to said identical point of the second image is calculated on the basis of the rotation matrix and of the translation vector between the first image and the second image.

Again preferably, the depth at the first instant of the point in space corresponding to said identical point of the third image is calculated on the basis of the rotation matrix and of the translation vector between the first image and the third image.

Advantageously, the method comprises a step of storage, after the calculation step, of the depth for each identical point detected in the second image of the sequence of images.

Again advantageously, the method comprises a step of storage, after the calculation step, of the depth for each identical point detected in the third image of the sequence of images.

Such storages make it possible to save the results obtained by the depth calculations.

An aspect of the invention also relates to an image processing module allowing the identification of at least one same point appearing on each image of a sequence of images, said sequence of images comprising a first image, a second image and a third image generated respectively at a first instant, at a second instant, later than the first instant, and at a third instant, later than the second instant, by a camera mounted in an automotive vehicle, said image processing module being characterized in that it is configured to:

detect a plurality of identical points in each image of the sequence of images relating to a plurality of repetitive patterns in each image of the sequence of images, calculate the depth at the first instant of the point in space corresponding to said identical point of the second image for each identical point detected in the second image of the sequence of images, calculate the depth at the first instant of the point in space corresponding to said identical point of the third image, for each identical point detected in the third image of the sequence of images, identify in the second image and in the third image, identical points corresponding to the points in space for which the calculated distance is identical, these points in space representing respectively in the second image and in the third image one and the same real point.

Preferably, the image processing module is configured to calculate the depth at the first instant of the point in space corresponding to said identical point of the second image on the basis of the rotation matrix and of the translation vector between the first image and the second image.

Again preferably, the image processing module is configured to calculate the depth at the first instant of the point in space corresponding to said identical point of the third image on the basis of the rotation matrix and of the translation vector between the first image and the third image.

Advantageously, the image processing module is configured to store the depth for each identical point detected in the second image of the sequence of images and the depth for each identical point detected in the third image of the sequence of images.

An aspect of the invention also relates to an automotive vehicle comprising an image processing module such as is presented above.

BRIEF DESCRIPTION OF THE DRAWINGS

Other features, advantages, and aspects of the invention will become apparent from the following description, given with reference to the appended figures that are given by way of non-limiting example and in which identical references are given to similar objects.

DETAILED DESCRIPTION OF THE PREFERRED EMBODIMENTS

The image processing device according to aspects of the invention will now be described with reference to FIGS. 1 to 8.

Figure 1:
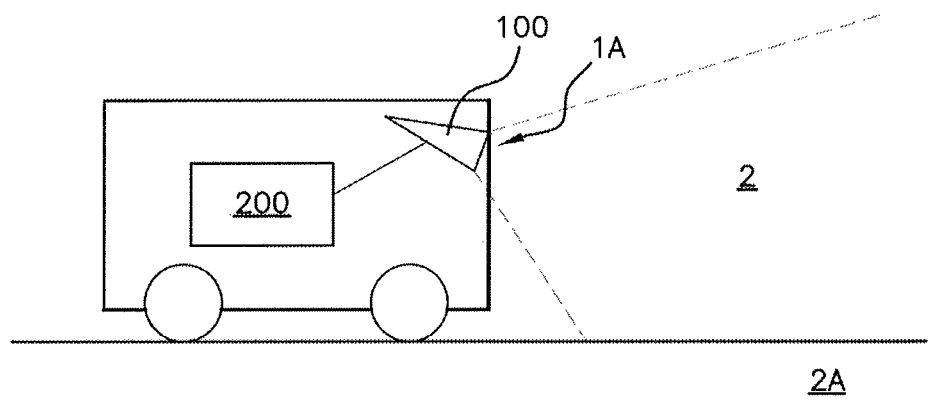
FIG. 1 schematically illustrates a vehicle according to an aspect of the invention.

With reference to FIG. 1, the device 10 for processing images is mounted in an automotive vehicle 1. By the terms "automotive vehicle" is meant in a standard manner a road vehicle propelled by a reciprocating engine, internal-combustion engine, electric motor or gas-turbine engine or a hybrid engine such as, for example, a car, a van, a truck, etc.

The device 10 comprises a video camera 100 and an image processing module 200, which is implemented for example by a computer (not represented) embedded on-board the vehicle 1. Preferably, the camera 100 is mounted at the level of the central upper part of the front windshield (not represented) of the vehicle 1. It will however be noted that the camera 100 could be mounted in any other suitable place on the vehicle 1 (side, rear, etc.). The camera 100 is configured to generate a plurality of images of the environment 2 of the vehicle 1, for example the road 2A and its verges, so that the image processing module 200 utilizes them.

The image processing module 200 processes the images generated by the camera 100 so as to provide driving assistance to the driver of the vehicle 1. By way of example, such a processing of images can consist in detecting objects in the images, such as for example signposts, road curbs, obstacles (pedestrians or other . . . ), so as to inform the driver respectively of a speed limit, of a risk of leaving the road or of a risk of collision. Such a processing of images can also make it possible to measure the height of a bridge or the position of an obstacle so as to warn the driver thereof or to undertake emergency braking.

In the case where repetitive patterns appear on the successive images generated by the camera 100 (i.e. identical pixels appearing in several places in the images), it may be useful to distinguish them from one image to the next so as to avoid causing interpretation errors which could present a risk in respect of the driving of the vehicle 1. These repetitive patterns may for example correspond to posts of a highway barrier running along the trajectory of the vehicle 1 so that several of them appear on successive images generated by the camera 100.

Before being able to distinguish groups of pixels representing repetitive patterns (which are therefore identical but appear in several places on each image of the sequence of successive images), it is firstly necessary to detect the points or groups of pixels corresponding to these repetitive patterns in the sequence of images.

A preferred embodiment making it possible to detect the points or groups of pixels corresponding to repetitive patterns in the sequence of images will now be described. It will however be noted that any other suitable detection scheme could be used without limiting the scope of aspects of the present invention.

Figure 2:
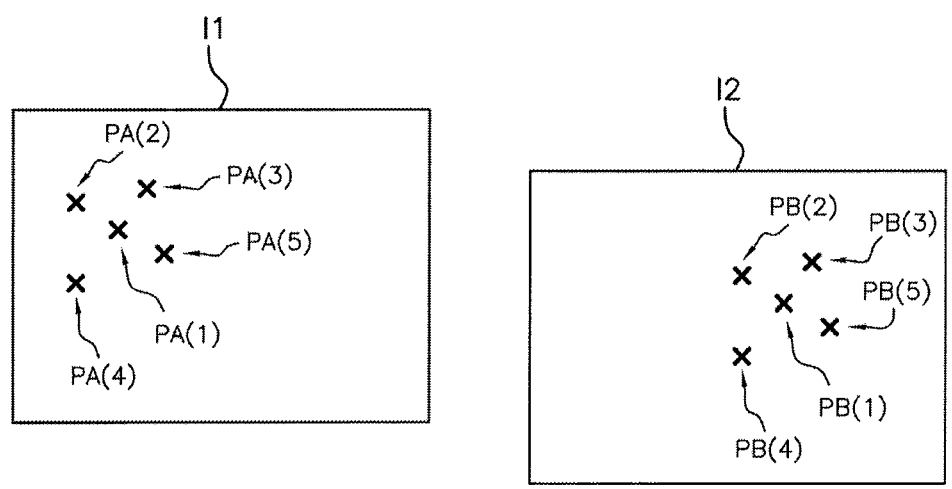
FIG. 2 schematically illustrates a first image and a second image, consecutive to the first image, which are acquired by the camera.

In the embodiment described by way of example, with reference to FIG. 2, the image processing module 200 is configured to carry out a first series of tasks. By way of example, this first series of tasks is described hereinafter with reference to three successive images of a sequence of images: a first image I1, a second image I2, later than the first image I1, and a third image I3 (which is not represented), later than the second image I2, these images having been acquired by the camera 100 respectively at a first instant t1, a second instant t2 and a third instant t3, preferably consecutive.

Firstly, the image processing module 200 is configured to determine, for each pixel of the first image I1, for each pixel of the second image I2 and for each pixel of the third image I3 (which is not represented), a characteristic signature indicative of said pixel.

Figure 3:
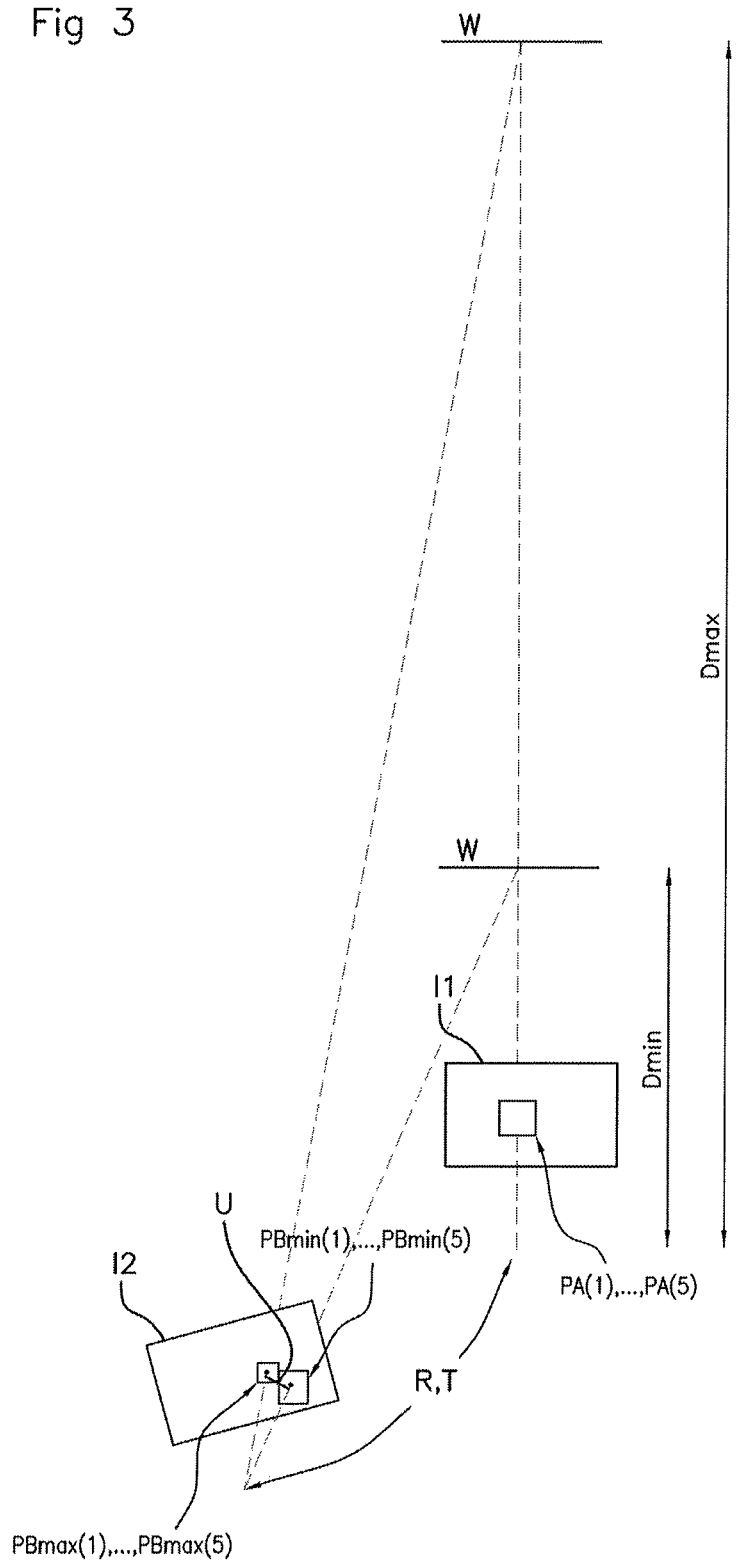
FIG. 3 schematically illustrates two projections of a zone of pixels of a first image into a second image by homography on a plane of projection situated respectively at a predetermined minimum distance and at a predetermined maximum distance.

Moreover, with reference to FIG. 3, the image processing module 200 is configured to determine a rotation matrix R and a translation vector T in respect of the rotation and translation of the camera 100 between two consecutive images, here between the first image I1 and the second image I2, as well as between the second image I2 and the third image I3 (which is not represented). The rotation matrix R and the translation vector T correspond respectively to the rotation and to the translation of the camera 100 in a benchmark tied to the object.

The determination of the rotation matrix R and of the translation vector T may, for example, be carried out by using a static object represented on the three images, for example the road or a bridge, or else a dynamic object moving with respect to the camera 100, for example another vehicle.

In the latter case, it is necessary to know where the object is situated in the image (for example by using a classification scheme known per se) and then to determine the rotation matrix R and the translation vector T of the camera 100 in the benchmark tied to the object, the translation vector T being in this case weighted by a coefficient α which can be determined in a known manner by processing of images, knowing the size of the object.

The determination of the rotation matrix R and of the translation vector T between the first image I1 and the second image I2 can be carried out by an algorithm for processing images or through the use of one or more inertial sensors and/or of geographical position sensors (for example GPS) in a manner known per se.

Thereafter, with reference to FIG. 2, the image processing module 200 is configured to select a pixel PA(1) in the first image I1 for which one seeks a corresponding pixel in the second image I2. By the terms "corresponding pixel" is meant a pixel representing one and the same spatial zone of the environment 2 of the vehicle 1.

Still with reference to FIG. 2, the image processing module 200 is also configured to determine in the first image I1 an initial set of pixels comprising the pixel selected PA(1) and a plurality of pixels PA(2), . . . , PA(5), located in the neighborhood of the selected pixel PA(1).

By the term neighborhood is meant in a known manner a plurality of pixels PA(2), . . . , PA(5) adjacent to the pixel selected PA(1) in the first image I1. The number of pixels of the neighborhood is four in this example for the sake of clarity but it goes without saying that the neighborhood of the pixel selected PA(1) can comprises more or fewer than four pixels (more generally "n" pixels, "n" being a natural integer greater than or equal to 2).

Such an initial set of pixels PA(1), PA(2), . . . , PA(5) can be a window or a portion of the first image I1, for example a window of 10×10 pixels. It will be noted here that the number n of pixels and the shape of the window or of the image portion can vary by design. It will also be noted that five pixels have been represented in the set by way of example but that the number of pixels of the set could of course be less than or greater than five.

The image processing module 200 is also configured to determine, in the second image I2, a plurality of sets of pixels PB(1), . . . , PB(5) by projection, on the basis of the determined rotation matrix R and of the determined translation vector T, of the determined initial set of pixels PA(1), . . . , PA(5). Each set of this plurality of sets of pixels PB(1), . . . , PB(5) comprises a first pixel PB(1) corresponding to the pixel selected PA(1) in the first image I1.

Figure 4:
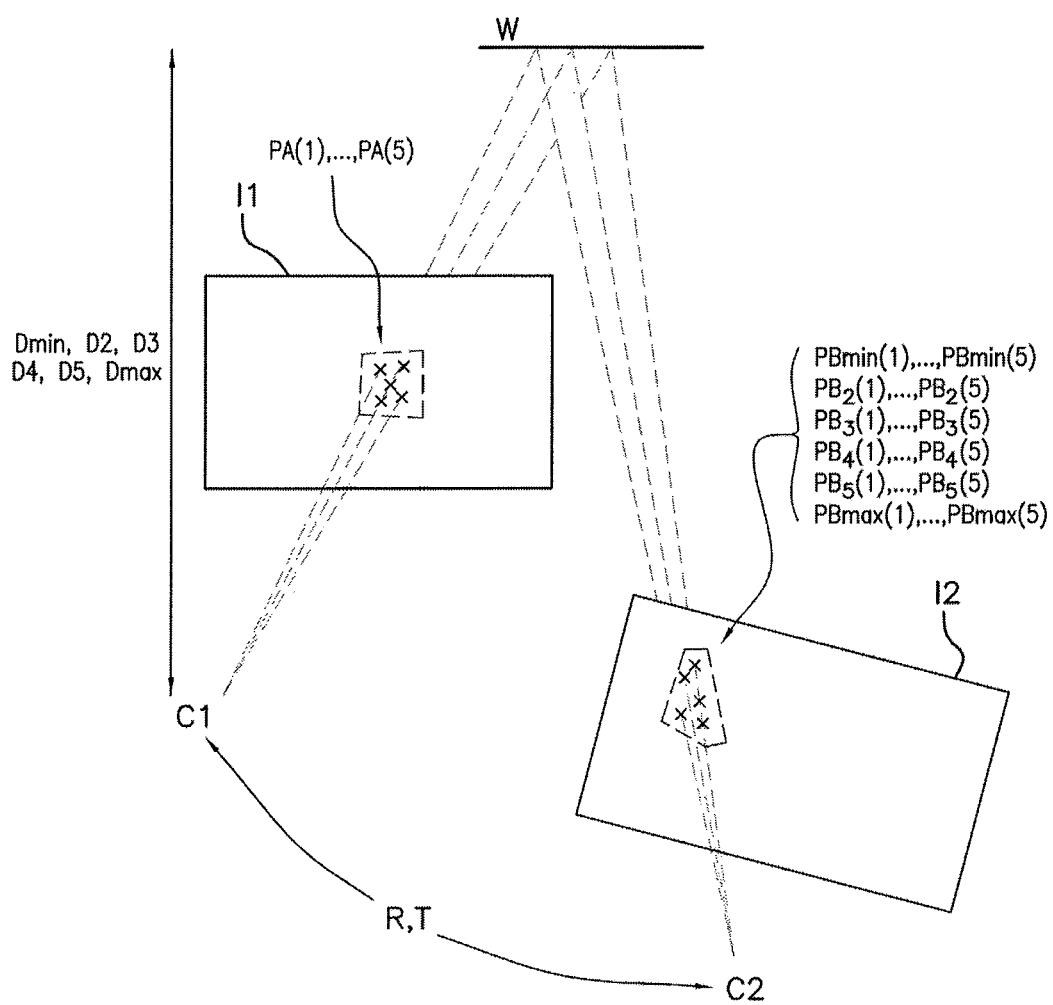
FIG. 4 schematically illustrates a projection by homography, on a plane of projection situated at a predetermined distance, of a set of points of a first image into a second image, the correspondence between the two images being carried out via a rotation matrix and a translation vector of the camera.

With reference to FIGS. 3 and 4, this projection is carried out on a predetermined plane W situated at various predetermined distances D from the optical center C1 of the camera 100 for the first image I1.

More precisely, with reference to FIG. 3, the image processing module 200 is firstly configured to determine, in the second image I2, a first set of pixels PBmin(1), . . . , PBmin(5) by projection, on the basis of the determined rotation matrix R and of the determined translation vector T, of the initial set of pixels PA(1), . . . , PA(5) determined on a predetermined plane W of projection situated at a predetermined minimum distance Dmin. This first set PBmin(1), . . . , PBmin(5) comprises a first pixel PBmin(1) corresponding to the pixel selected PA(1) in the first image I1.

Similarly, still with reference to FIG. 3, the image processing module 200 is configured to determine, in the second image I2, a second set of pixels PBmax(1), . . . , PBmax(5) by projection, on the basis of the determined rotation matrix R and of the determined translation vector T, of the determined initial set PA(1), . . . , PA(5) on the plane W situated at a predetermined maximum distance Dmax. This second set PBmax(1), . . . , PBmax(5) comprises a second pixel PBmax(1) corresponding to the pixel selected PA(1) in the first image I1.

With reference now to FIG. 4, the determination of the projection of a pixel of the first image I1 in the second image I2 via a plane W of projection corresponds to a homography of the pixel in a first frame, whose origin is the optical center C1 of the camera 100 during the acquisition of the first image I1, to a second frame whose origin is the optical center C2 of the camera 100 during the acquisition of the second image I2, via the plane W of projection situated at one of the determined distances. Such a projection by homography is carried out on the basis of the rotation matrix R and of the translation vector T, of a vector $n_2$ normal to the plane W of projection and of the distance D of the plane W with respect to the optical center C1 in the following manner:

$$H = R - \left(\frac{T \times n_2^T}{D}\right).$$

Such a homography being known per se, it will therefore not be further detailed here.

In theory, the minimum distance Dmin is zero and the maximum distance Dmax corresponds to infinity. In practice, it is possible to choose a minimum distance Dmin of a few meters, for example 5 meters, and a maximum distance Dmax of a few tens of meters, for example 50 or 100 meters, in particular when the pixel selected PA(1) in the first image I1 represents an identified object whose separation from the camera 100 is known, for example the road running along the lower part of the images acquired by the camera 100.

The plane W of projection can be determined according to the nature of the selected pixel PA(1). For example, when the selected pixel PA(1) represents a zone of the road 2A on which the vehicle 1 is traveling, a plane W corresponding to the plane of the road 2A can be used as illustrated schematically in FIG. 2. This plane W is a virtual plane of projection which will make it possible to estimate by homography, that is to say geometrically, the corresponding position of a pixel of the first image I1 in the second image I2.

Once the first pixel PBmin(1) and the second pixel PBmax(1) have been selected, the image processing module 200 is configured to determine a segment U joining the first pixel PBmin(1) and the second pixel PBmax(1), called an epipolar segment.

Figure 5:
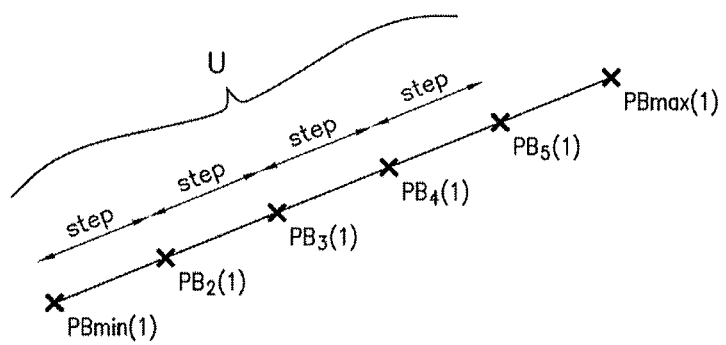
FIG. 5 schematically illustrates an epipolar segment obtained in a second image by the projection of a set of pixels of a first image onto a plane situated consecutively at a plurality of predetermined distances lying between a predetermined minimum distance and at a predetermined maximum distance.

With reference to FIG. 5, the image processing module 200 is thereafter configured to select a plurality of points PB$_2$(1), . . . , PB$_5$(1) along the determined segment U. In an advantageous manner, the points PB$_2$(1), . . . , PB$_5$(1) can be distributed along the segment U starting from the first pixel PBmin(1) and spaced apart by a step of predetermined width, for example every 0.1 pixels. The number of points PB$_2$(1), . . . , PB$_5$(1) selected on the segment U is four in this example but it goes without saying that it could be greater or fewer than four.

The image processing module 200 is configured to associate each point PB$_2$(1), . . . , PB$_5$(1) selected with a pixel of the second image I2. In practice, it is considered that a point is associated when its coordinates in the image correspond to the coordinates of a pixel, that is to say that the point selected is situated in the zone of the image covered (or represented) by said pixel.

The image processing module 200 is configured to compare the signature of each pixel corresponding to a selected point PB$_2$(1), . . . , PB$_5$(1) with the signature of the pixel selected in the first image I1.

The image processing module 200 is configured to detect a repetitive pattern between the first image I1 and the second image I2 when a plurality of signatures of pixels associated with the points PB$_2$(1), . . . , PB$_5$(1) selected on the segment U correspond to the signature of the pixel selected in the first image I1.

The image processing module 200 is also configured to carry out the tasks described hereinabove between the second image I2 and the third image I3 (which is not represented) and more generally between two successive images of a sequence of images so as to detect repetitive patterns in each image of the sequence of images I1, I2, I3.

Thereafter, so as to identify a point or a pixel group corresponding to one and the same pattern on two successive images, from among a plurality of successive patterns, the image processing module 200 is configured to carry out a second series of tasks.

Firstly, the image processing module 200 is configured to detect a plurality of identical points in each image of the sequence of images I1, I2, I3 which relates to a plurality of repetitive patterns in each image of the sequence of images I1, I2, I3.

The image processing module 200 is configured, for each identical point detected in the second image I2 of the sequence of images I1, I2, I3, to calculate the depth at the first instant t1 of the point in space corresponding to said identical point of the second image I2.

The image processing module 200 is configured, for each identical point detected in the third image I3 of the sequence of images I1, I2, I3, to calculate the depth at the first instant t1 of the point in space corresponding to said identical point of the third image I3 (which is not represented).

The image processing module 200 is configured to identify, in the second image I2 and in the third image I3 (which is not represented), identical points corresponding to the points in space for which the calculated depth is identical, these points in space representing respectively in the second image I2 and in the third image I3 (which is not represented) one and the same real point.

An aspect of the invention will now be described in its implementation with reference to FIGS. 8 and 9.

Figure 8:
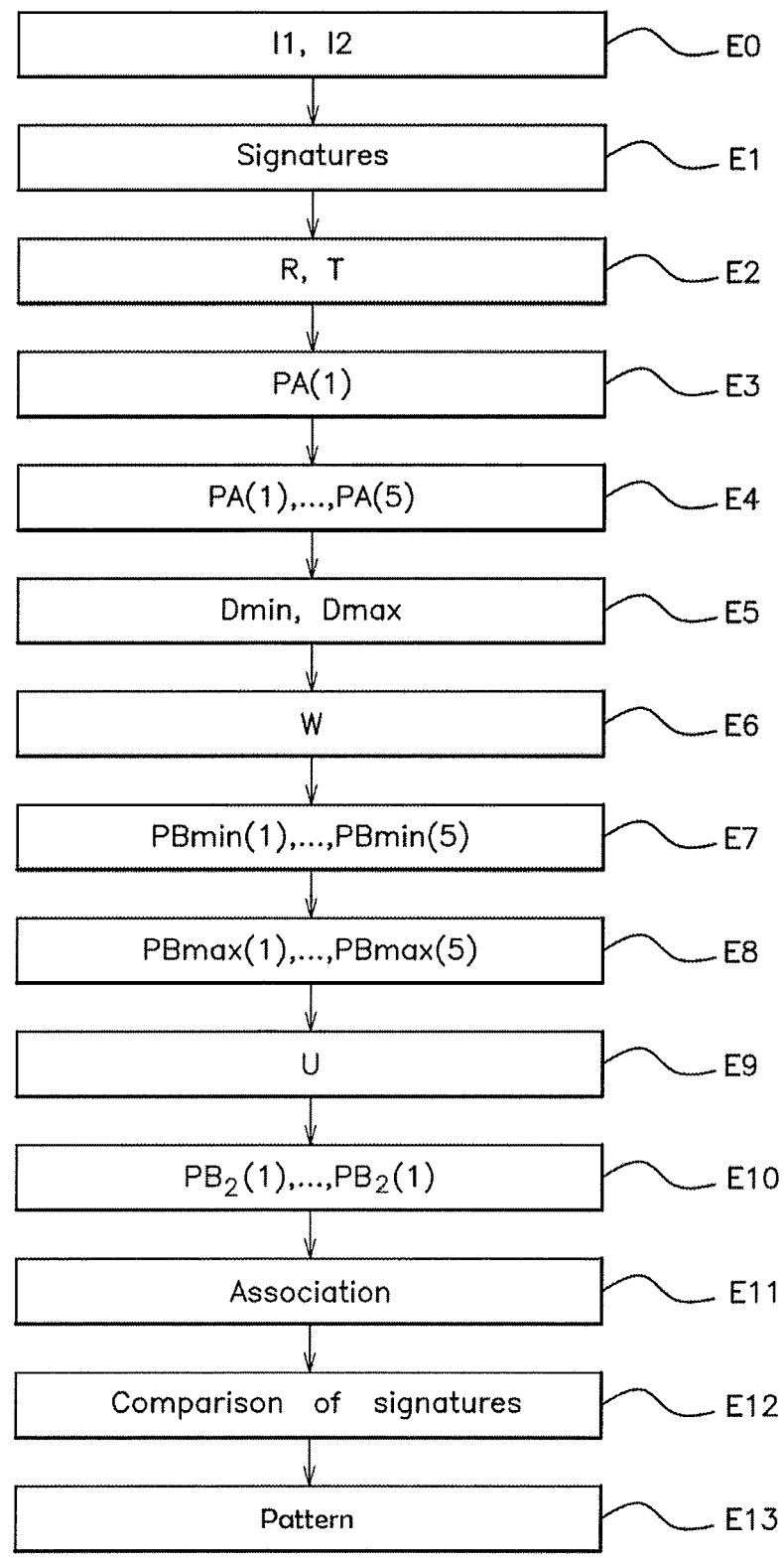
FIG. 8 illustrates an embodiment of the step of detection of the method of processing images according to an aspect of the invention.

Firstly, in a step E0, with reference in particular to FIGS. 2 and 8, the camera 100 acquires a first image I1 and a second image I2, preferably consecutive. It will be noted that the method can be implemented by taking as first image I1 the image whose acquisition is temporally the first (earlier or previous image in the flow of images acquired by the camera) and as second image I2, the successive image in the flow of images. Conversely, the method can be implemented by taking as first image I1 the image whose acquisition is temporally later (following image in the flow of images acquired by the camera) than the second image I2 and as second image I2, the previous image in the flow of images. In the example which follows, the earlier image is chosen as first image I1 and the later image (i.e. succeeding in the flow of images) is chosen as second image I2.

In a step E1, the image processing module 200 determines, for each pixel of the first image I1 and for each pixel of the second image I2, a characteristic signature indicative of said pixel.

Such a signature can be determined on the basis of the local analysis of an image and thus characterizes the content of this image. There exist several ways of creating a signature based on descriptors. These descriptors can have certain properties such as invariance under rotation, under magnification or change of brightness. In general, the case of use defines the properties necessary for the descriptors and makes it possible to determine the most advantageous scheme. For example, the Census transformation gives a signature based on the relative differences of intensity (Zabih, R., Woodfill, J. I.: Non-parametric Local Transforms for Computing Visual Correspondence. In: Eklundh, J.-O. (ed.) ECCV 1994. LNCS, vol. 801, pp. 151-158. Springer, Heidelberg (1994)), incorporated herein by reference. Another example is the scale-invariant transformation of visual characteristics (SIFT: Scale-Invariant Feature Transform).

In computer vision, the extraction of visual characteristics (or "visual features extraction") consists of mathematical transformations calculated on the pixels of a digital image. The visual characteristics generally make it possible to account better for certain visual properties of the image which are used for subsequent processings entering into the framework of applications such as the detection of objects or the search for images by content.

The characterization of an image can be calculated as a restricted number of pixel. Accordingly, it is firstly necessary to detect the zones of interest of the image and then to calculate a characteristic vector in each of these zones. These zones of interest are for example the ridges or the salient points of the image (zones of strong contrast). They may also entail points taken randomly or regularly in the image (so-called dense sampling).

The characteristic vector sometimes contains data stemming from detection, such as the orientation of the ridge or the magnitude of the gradient in the zone of interest.

Generally, the characteristic vector at a pixel is calculated on a neighborhood of this pixel, that is to say on the basis of an imagette centered on this pixel. It can be calculated at various scales so as to circumvent the zoom factor. Patterns previously used globally, such as color histograms or vectors accounting for the orientation of the gradients of the gray levels, are among the local characteristics customarily calculated. Three examples of neighborhoods are used to define a texture and to calculate a local binary pattern (LBP). Certain schemes such as SIFT or SURF include at one and the same time zone of interest detection and the calculation of a characteristic vector in each of these zones. Concerning the characteristic vector, the SIFTs are coarsely a histogram of the orientations of the gradient and the SURFs consist of the approximation calculation for Haar wavelets. In a similar vein, the local binary patterns are a calculation of cooccurrence of the local gray levels of an image and the HOGs of the histograms of oriented gradients, fairly similar to the SIFTs, calculated according to a dense sampling.

With reference to FIG. 3, the image processing module 200 thereafter determines, in a step E2, the rotation matrix R and the translation vector T between the first image I1 and the second image I2.

The image processing module 200 selects, in a step E3, a pixel selected PA(1) in the first image I1, for which pixel a corresponding pixel in the second image I2 must be determined.

In an advantageous manner, the image processing module 200 can firstly select a pixel, which does not have any optical flow in the second image I2, in a zone of interest of the first image I1, for example a side of the image representing the edge of the road when one wishes to forewarn the driver of a risk of leaving the road, the top of the image representing the sky when one wishes to detect a bridge so as to evaluate the height thereof etc.

Thereafter, with reference to FIG. 2, for the selected pixel PA(1), the image processing module 200 determines in the first image I1, in a step E4, an initial set of pixels PA(1), . . . , PA(5) comprising the selected pixel PA(1) and a plurality of pixels PA(2), . . . , PA(5) located in the neighborhood of the selected pixel PA(1). In the example of FIG. 2, for the sake of clarity, only four pixels PA(2), PA(3), PA(4) and PA(5) of the neighborhood of the selected pixel PA(1) have been selected.

With reference to FIG. 3, the image processing module 200 determines or selects (for example in a list stored in a memory area (not represented) of the device 10) in a step E5 a minimum distance Dmin and a maximum distance Dmax between which the spatial point represented by the selected pixel PA(1) is situated. These values Dmin and Dmax can be determined as described hereinabove or else by using the history of the previous images or geometric knowledge of the scene, such as for example a plane road.

In a step E6, the image processing module 200 determines a plane W of projection, of the selected pixel PA(1), in the second image I2, for example a vertical plane situated facing the front of the vehicle 1. It will be noted that steps E5 and E6 may be reversed.

With reference to FIGS. 2 and 3, in a step E7, the image processing module 200 determines, in the second image I2, a first set of pixels PBmin(1), . . . , PBmin(5) by homographic projection of the initial set of pixels PA(1), . . . , PA(5) determined on the plane W, by considering that the latter is placed at the determined minimum distance Dmin. This first set PBmin(1), . . . , PBmin(5) comprises a first pixel PBmin(1) corresponding, by homographic projection on the plane W at the minimum distance Dmin, to the pixel selected PA(1) in the first image I1.

Similarly, in a step E8, the image processing module 200 determines, in the second image I2, a second set of pixels PBmax(1), . . . , PBmax(5) by homographic projection of the initial set PA(1), . . . , PA(5) determined on the predetermined plane W situated at the predetermined maximum distance Dmax. This second set PBmax(1), . . . , PBmax(5) comprises a second pixel PBmax(1) corresponding, by homographic projection of the plane W at the maximum distance Dmax, to the pixel selected PA(1) in the first image I1. It goes without saying that steps E7 and E8 may be reversed.

With reference to FIGS. 3 to 5, the image processing module 200 thereafter determines, in a step E9, the segment U joining the first pixel PBmin(1) and the second pixel PBmax(1) in the second image I2 and then selects, in a step E10, a plurality of points PB2(1), . . . , PB5(1) on the segment U thus determined, for example every 0.1 pixels.

Instead of a single segment, it would also be possible to consider an epipolar cylinder which is defined as being an epipolar segment of a thickness greater than a pixel (preferably a thickness of an odd number of pixels, thus the dilation of the segment occurs on either side of the segment of thickness 1).

The image processing module 200 thereafter associates in a step E11 a pixel of the second image I2 with each point $PB_2(1), \ldots, PB_5(1)$ selected on the segment U.

The image processing module 200 then compares in a step E12 the signature of the pixel selected in the first image I1 with the signature of each pixel associated with a point $PB_2(1), \ldots, PB_5(1)$ selected.

Finally, in a step E13, the image processing module 200 detects a point of a repetitive pattern between the first image I1 and the second image I2 when a plurality of signatures of pixels associated with the plurality of points $PB_2(1), \ldots, PB_5(1)$ selected on the segment U correspond to the signature of the pixel selected in the first image I1.

In the nonlimiting example which has been described hereinabove, a single epipolar segment was used but it will be noted that as a variant, a plurality of, for example parallel, epipolar segments could be used, each segment being defined by a plurality of points associated with pixels of the second image I2 so that the signature of each point is compared with the signature of the associated pixel in the first image I1 so as to detect in a still more precise manner repetitive patterns in the images. Likewise, it would be possible to define, rather than a segment or a plurality of segments, an epipolar cylinder comprising the segment U and a plurality of points associated with pixels of the second image I2 and whose signatures could be compared with the corresponding pixels of the first image I1 so as to detect in a still more precise manner repetitive patterns in the images.

It will be noted moreover that for dynamic objects, the rotation and translation between the images are preferably expressed with respect to a world frame which is related to the dynamic object.

Thereafter, the image processing module 200 will identify the points or groups of pixels corresponding to repetitive patterns so as to distinguish them from one another on one and the same image. Stated otherwise, the image processing module 200 will calculate the depth of the points in space that are represented in the repetitive patterns on each image of the sequence of consecutive images I1, I2 and I3.

It will be noted firstly that at this juncture, the rotation matrix R and translation vector T undergone by the camera 100 between the first instant t1 and the second instant t2 have been determined during step E1 with the scheme described hereinabove and are known. Likewise, the rotation matrix R and translation vector T undergone by the camera 100 between the second instant t2 and the third instant t3 have been determined during the detection, described hereinabove, of the repetitive patterns and are known.

Figure 6:
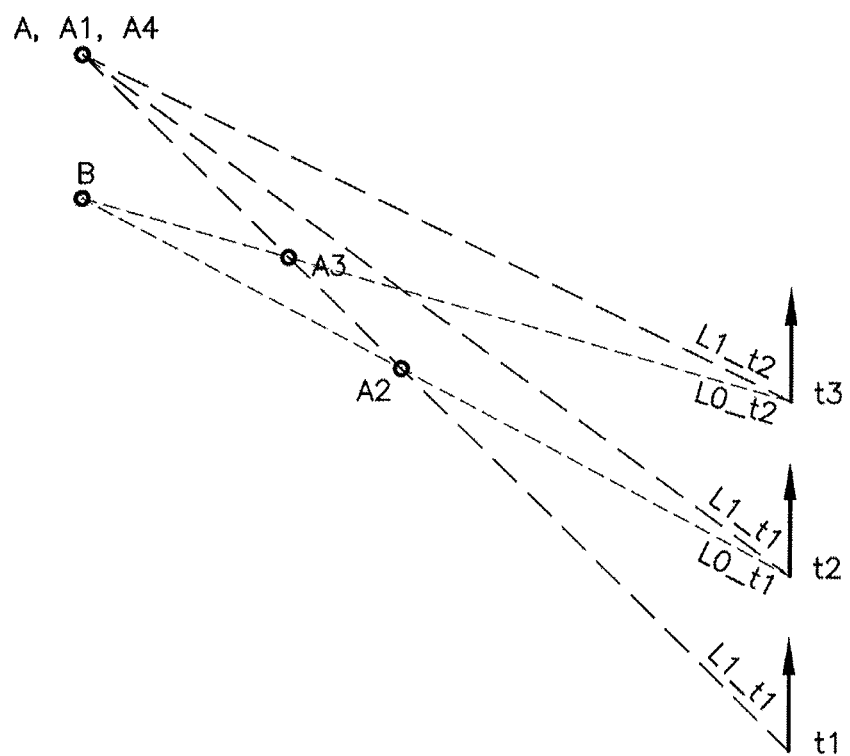
FIG. 6 schematically illustrates the displacement of a vehicle with respect to a plurality of repetitive structures.

Represented with reference to FIG. 6 is the example of a repetitive pattern generated by two points in space A and B which have the same signature in each image of the sequence of consecutive images I1, I2 and I3, this example being able to be generalized to as many points as are included in the repetitive pattern. Moreover, also represented is the motion of the camera 100 as a function of these points in space A and B. Indeed, the three vertical arrows represent the location of the camera 100, and therefore of the vehicle, as well as the sense and the direction of displacement of said vehicle, at the three consecutive instants t1, t2, t3.

Figure 7:
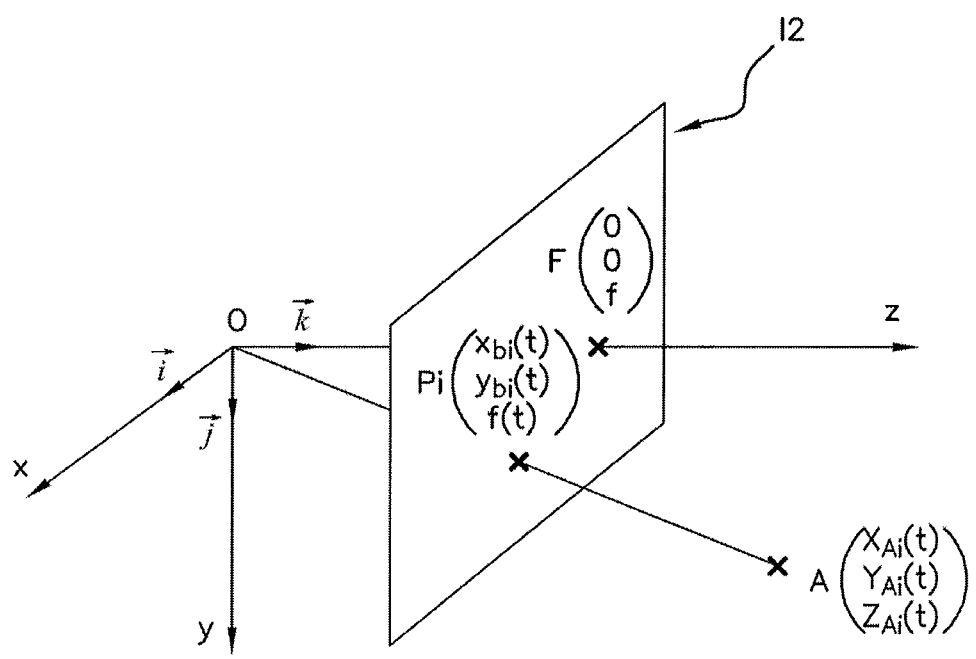
FIG. 7 represents the pinhole model, used here to describe the process for forming the images by a camera.

Firstly, with reference to FIG. 7, there is represented the pinhole model, used here to describe the process for forming the images by the camera 100. Stated otherwise, the pinhole model makes it possible to describe how to project at least one 3D (three-dimensional) object onto a 2D (two-dimensional) image.

The camera 100 possesses the following intrinsic parameters:
an optical center O,
a focal length f,
a principal point F.

The so-called "pinhole" model, known per se, is represented here in an orthonormal frame (O, $\vec{i}$, $\vec{j}$, $\vec{k}$) in three dimensions, where the optical center O is the origin of the frame. In this orthonormal frame (O, $\vec{i}$, $\vec{j}$, $\vec{k}$), the principal point F possesses the coordinates (0, 0, f).

Each image formed by the camera 100 is situated in a plane called the "plane of the image" xOy with origin O. The point in space A is a 3D point with cartesian coordinates ($X_A(t2)$, $Y_A(t2)$, $Z_A(t2)$) in the orthonormal frame (O, $\vec{i}$, $\vec{j}$, $\vec{k}$) at the second instant t2. The point P2 in two dimensions belongs to the second image I2 and represents the projection of the point in space A of the real object in the plane of the image xOy in which said second image I2 is situated. Said point P2 possesses coordinates ($x_{b2}(t2)$, $y_{b2}(t2)$, f) at the second instant t2 in the orthonormal frame (O, $\vec{i}$, $\vec{j}$, $\vec{k}$) with:

$$x_{b2} = (t2) = f \times \frac{X_A(t2)}{Z_A(t2)} \quad [1]$$

$$y_{b2} = (t2) = f \times \frac{Y_A(t2)}{Z_A(t2)} \quad [2]$$

The pinhole model thereafter makes it possible to determine the depth of the points in space A and B since the position of the projection in each image of the image sequence I1, I2, I3 of the points in space A and B of the repetitive patterns is known.

Figure 9:
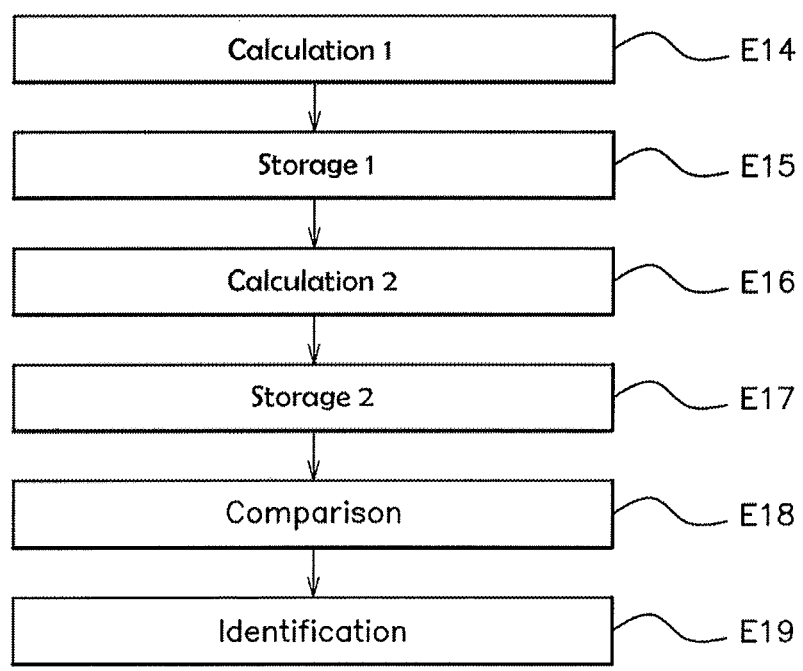
FIG. 9 illustrates an embodiment of the method of processing images according to an aspect of the invention.

With reference to FIG. 9, during a first calculation, called "Calculation 1" (step E14), the image processing module 200 calculates the depth of the point in space A in the camera frame at the first instant t1 on the basis of the second image I2.

Firstly, the image processing module 200 associates the projection in the first image I1 of the point in space A and the projection in the second image I2 of the point in space A.

A first calculation between a first instant t1 and a second instant t2 makes it possible to determine the depth $Z_A(t1)$ in the camera frame, of the point in space A (point in three dimensions) at the first instant t1 on the basis of the 2D coordinates of the point P1 ($x_{b1}(t1)$; $y_{b1}(t1)$; f) which corresponds to the projection of the point in space A in the image at the first instant t1, of the 2D coordinates of the point P2 of the projection of the point A at the second instant t2 and of the knowledge of the rotation matrix R and of the translation vector T of the camera between the first instant t1 and the second instant t2.

Previously, the rotation matrix R and the translation vector T have been determined and thus make it possible to calculate for any point in space A at the first instant t1, denoted at(t1), the point in space A corresponding to the second instant t2, denoted A(t2), according to the following formula:

$$A(t2) = R \times A(t1) + T \quad [3]$$

Knowing that:

$$T = \begin{pmatrix} T_x \\ T_y \\ T_z \end{pmatrix} \text{ and } R = \begin{bmatrix} R_{11} & R_{12} & R_{13} \\ R_{21} & R_{22} & R_{23} \\ R_{31} & R_{32} & R_{33} \end{bmatrix}$$

Step E13 has allowed the detection of a plurality of identical points, defined as a plurality of points representing the same point in space in each image of the sequence of images I1, I2, I3, relating to a plurality of repetitive patterns in each image of the sequence of images I1, I2, I3. Thereafter, a point P2 is selected at the second instant t2, with coordinates ($x_{b2}(t2)$; $y_{b2}(t2)$; f) in the second image I2. Said point P2 corresponds to one of the identical points detected in the second image I2 of the sequence of images I1, I2, I3. The calculation of the depth between the camera 100 and the point in space corresponding to said identical point P2 of the second image I2 at the first instant t1 follows therefrom.

By virtue of the rotation matrix R and of the translation vector T it is possible to determine the position of said point in space A in the first image I1 at the first instant t1, that is to say at the instant preceding the second instant t2. Thus, to determine the position of said point in space A, it is necessary to calculate $Z_A(t1)$, the depth of the point in space A, so as to deduce therefrom the distance between the optical center O of the camera 100 and the point in space A.

Accordingly, equation [3] is expanded and the terms $X_A(t2)$, $Y_A(t2)$, $Z_A(t2)$ are isolated, thereby making it possible to obtain the expressions for $X_A(t2)$, $Y_A(t2)$ and $Z_A(t2)$ as a function of $X_A(t1)$, $Y_A(t1)$, $Z_A(t1)$:

$$X_A(t2) = R_{11} \times X_A(t1) + R_{12} \times Y_A(t1) + R_{13} \times Z_A(t1) + T_x$$

$$Y_A(t2) = R_{21} \times X_A(t1) + R_{21} \times Y_A(t1) + R_{23} \times Z_A(t1) + T_y$$

$$Z_A(t2) = R_{31} \times X_A(t1) + R_{32} \times Y_A(t1) + R_{33} \times Z_A(t1) + T_z$$

On the basis of the above result and of equations [1] and [2] and by factorizing $Z_A(t1)$ in the right hand side, we obtain:

$$\frac{x_{b2}(t2) \times Z_A(t2)}{f} = \left(\frac{R_{11} \times x_{b1}(t1)}{f} + \frac{R_{12} \times y_{b1}(t1)}{f} + R_{13}\right) \times Z_A(t1) + T_x \quad [4]$$

$$\frac{y_{b2}(t2) \times Z_A(t2)}{f} = \left(\frac{R_{21} \times x_{b1}(t1)}{f} + \frac{R_{22} \times y_{b1}(t1)}{f} + R_{23}\right) \times Z_A(t1) + T_y \quad [5]$$

$$Z_A(t2) = \left(\frac{R_{31} \times x_{b1}(t1)}{f} + \frac{R_{32} \times y_{b1}(t1)}{f} + R_{33}\right) \times Z_A(t1) + T_z \quad [6]$$

Inserting equation [6] into equations [4] and [5], we obtain:

$$\frac{x_{b2}(t2) \times [a_3 \times Z_A(t1) + T_z]}{f} = a_1 \times Z_A(t1) + T_x \quad [4\text{bis}]$$

$$y_{b2}(t2) \times [a_3 \times Z_A(t1) + T_z] = a_2 \times Z_A(t1) + T_y \quad [5\text{bis}]$$

with:

$$a_1 = \frac{R_{11} \times x_{b1}(t1)}{f} + \frac{R_{12} \times y_{b1}(t1)}{f} + R_{13}$$

$$a_2 = \frac{R_{21} \times x_{b1}(t1)}{f} + \frac{R_{22} \times y_{b1}(t1)}{f} + R_{23}$$

$$a_3 = \frac{R_{31} \times x_{b1}(t1)}{f} + \frac{R_{32} \times y_{b1}(t1)}{f} + R_{33}$$

Two solutions are obtained for $Z_A(t1)$:

$$Z_{A1}(t1) = \frac{T_x - \frac{T_z \times x_{b2}(t2)}{f}}{\frac{x_{b2}(t2) \times a_3}{f} - a_1}$$

$$Z_{A1}(t1) = \frac{T_y - \frac{T_z \times y_{b2}(t2)}{f}}{\frac{y_{b2}(t2) \times a_3}{f} - a_2}$$

The depth $Z_{A1}(t1)$ corresponds to a first possibility of depth for the point in space A at the first instant t1. Note that, in theory, these two different formulae for depth $Z_{A1}(t1)$ give an identical or substantially identical result. This result is stored in a step E15.

Thereafter, the image processing module 200 associates the projection in the first image I1 of the point in space A and the projection in the second image I2 of the point in space B. More precisely, with reference to FIG. 6, to confirm the depth of the point in space A, it is necessary to do a second depth calculation. Indeed, the projection of the point in space B at the second instant t2 is then observed. By this calculation, a depth $Z_{A2}(t1)$ will be obtained, being a second possibility of depth for the point in space A at the first instant t1.

The scheme being identical to that used for the depth $Z_{A1}(t1)$ of the point P1, the depth formulae $Z_{A1}(t1)$ and $Z_{A2}(t1)$ are identical too. Thus, the following results are obtained:

$$Z_{A2}(t1) = \frac{T_x - \frac{T_z \times x_{b2}(t2)}{f}}{\frac{x_{b2}(t2) \times a_3}{f} - a_1}$$

$$Z_{A2}(t1) = \frac{T_y - \frac{T_z \times y_{b2}(t2)}{f}}{\frac{y_{b2}(t2) \times a_3}{f} - a_2}$$

However, xb2 and yb2 are different in the formulae for the depths $Z_{A1}(t1)$ and $Z_{A2}(t1)$. Indeed, the projection of A2 in the image I2 is not the same as that of A1 in the image I2. Moreover, said two values of depth $Z_{A1}(t1)$ and $Z_{A2}(t1)$ are saved. Here, there are therefore two possibilities of depth, $Z_{A1}(t1)$ and $Z_{A2}(t1)$, thus signifying that we have several solutions relating to the depth of the point in space A.

Stated otherwise, with reference to FIG. 6, by using a motion of the camera between the instants t1 and t2 and two positions of the repetitive structure (the points A and B), a first triangulation makes it possible to find two possibilities of 3D position, namely the points A1 and A2, these two possibilities are saved.

At this juncture, it is not yet possible to make the association between the point in space A and its projection in each image, that is to say that we do not know which projection corresponds to the point in space A or to the point in space B.

A second calculation, described hereinafter, implementing a third image I3 is therefore necessary.

During a second calculation phase, called "Calculation 2" (step E16), the image processing module 200 calculates the depth of the point in space A in the camera frame at the first instant t1 on the basis of the third image I3 (which is not represented).

The aim of this step is to resolve the ambiguity present at the previous step, that is to say be able to know which projection in each image of the sequence of images I1, I2, I3 corresponds to the point in space A and which projection in each image of the sequence of images I1, I2, I3 corresponds to the point in space B.

The same calculations as previously are carried out but between the first instant t1 and the third instant t3. In the same way, there are therefore two possibilities of depth, $Z_{A3}(t1)$ and $Z_{A4}(t1)$, thus signifying that we have several possible distances between the camera 100 and the real object.

Since the first instant t1 and the third instant t3 are not directly consecutive instants, it is necessary to carry out an intermediate step. Indeed, the rotation matrix R and the translation matrix T between two consecutive instants, that is to say between the first instant t1 and the second instant t2 and between the second instant t2 and the third instant t3, are known. Thus, in order to know A(t3), it is necessary to aggregate the successive rotation and translation operations, with $R_{2/3}$ and $T_{2/3}$ being respectively the rotation matrix between the second instant t2 and the third instant t3, the translation matrix between the second instant t2 and the third instant t3.

We have firstly:

$$A(t2) = R \times A(t1) + T \quad [7]$$

$$A(t3) = R_{2/3} \times A(t2) + T_{2/3} \quad [8]$$

Thus, if we replace [7] in [8], we obtain:

$$A(t3) = R_{2/3} \times (R \times A(t1) + T) + T_{2/3}$$

$$A(t3) = R_{2/3} \times R \times A(t1) + R_{2/3} T + T_{2/3}$$

Moreover, said two values of depth $Z_{A3}(t1)$ and $Z_{A4}(t1)$ are stored in a step E17.

Here again, by using a motion of the camera between the instants t1 and t3 and two positions of the repetitive structure (the points A and B), a second triangulation makes it possible to find two possibilities of 3D position, namely the points A3 and A4, these two possibilities are saved.

To summarize, the two triangulations carried out on the basis of the points A and B of the repetitive structure in the three images I1, I2 and I3 have made it possible to find several correspondences namely A1, A2, A3 and A4, each having its own depth measurement, respectively $Z_{A1}(t1)$, $Z_{A2}(t1)$, $Z_{A3}(t1)$ and $Z_{A4}(t1)$.

The image processing module 200 carries out the comparison, in a step E18, of all the results of potential depth values obtained during "calculation 1" and "calculation 2", two depth values from among $Z_{A1}(t1)$, $Z_{A2}(t1)$, $Z_{A3}(t1)$ and $Z_{A4}(t1)$ being identical. These two depths of the same value correspond to one and the same real point, corresponding to the real point in space A. Thus, the image processing module 200 identifies the real point sought (step E19).

In the example illustrated with reference to FIG. 6, $Z_{A1}(t1)$ and $Z_{A4}(t1)$ are identical depth values and therefore correspond to the depth of the real point in space A. $Z_{A2}(t1)$ and $Z_{A3}(t1)$ correspond respectively to A2 and A3, fictitious points (ambiguities) in space whose depth value is different from the depth value of the real point in space A. Stated otherwise: the fictitious points in space A2 and A3 do not correspond to any real point (points in space A or B).

Thus, an aspect of the present invention makes it possible to identify depth values which persist over time and correspond to real objects, this not being the case for the ambiguities (or "phantom" correspondences) that are for example here the points A2 and A3 which therefore do not correspond to real objects and which, if they were associated in an erroneous manner with an objects of the environment of the vehicle, could give rise to poor estimation of the distance of the vehicle from the object of its environment and, consequently, poor application of the functions for assisting the driver with their driving.

Aspects of the invention therefore advantageously makes it possible to distinguish identical patterns repeating in the successive images of a sequence of images I1, I2, I3 and to resolve the ambiguity related to these repetitive patterns and thus be able to reconstruct information in respect of the depth of these repetitive patterns so as to effectively assist the driver with their driving.

The invention claimed is:

1. A method of processing images allowing identification of at least one same point appearing on each image of a sequence of images generated by a camera mounted in an automotive vehicle, said method comprising:
    detecting a plurality of identical points in each image of the sequence of images, the sequence of images comprising at least a first image generated at a first instant (t1), a second image generated at a second instant (t2) later than the first instant (t1), and a third image generated at a third instant (t3) later than the second instant (t2), the plurality of identical points relating to a plurality of repetitive patterns in each image of the sequence of images,
    for each of the plurality of identical points detected in the second image generated at the second instant (t2), calculating a depth ($Z_{A1}(t1)$, $Z_{A2}(t1)$) at the first instant (t1) of a point in space corresponding to said each of the plurality of identical points in the second image,
    for each of the plurality of identical points detected in the third image generated at the third instant (t3), calculating a depth ($Z_{A3}(t1)$, $Z_{A4}(t1)$) at the first instant (t1) of a point in space corresponding to said each of the plurality of identical points in the third image, and
    identifying, in the second image and in the third image, respective ones of each of the plurality of identical points corresponding to the points in space for which the calculated depth at the first instant (t1) is identical, these points in space representing respectively in the second image and in the third image one and the same real point.

2. The method as claimed in claim 1, in which the depth ($Z_{A1}(t1)$, $Z_{A2}(t1)$) at the first instant of the point in space corresponding to said each of the plurality of identical points in the second image is calculated on the basis of a rotation matrix and of a translation vector between the first image and the second image.

3. The method as claimed in claim 1, in which the depth ($Z_{A3}(t1)$, $Z_{A4}(t1)$) at the first instant of the point in space corresponding to said each of the plurality of identical points in the third image is calculated on the basis of a rotation matrix and of a translation vector between the first image and the third image.

4. The method as claimed in claim 1, comprising storing, after the calculating, of the depth ($Z_{A1}(t1)$, $Z_{A2}(t1)$) for each of the plurality of identical points detected in the second image of the sequence of images.

5. The method as claimed in claim 1, comprising storing, after the calculating, of the depth ($Z_{A3}(t1)$, $Z_{A4}(t1)$) for each of the plurality of identical points detected in the third image of the sequence of images.

6. An image processing module allowing identification of at least one same point appearing on each image of a sequence of images generated by a camera mounted in an automotive vehicle, said image processing module configured to:
    detect a plurality of identical points in each image of the sequence of images, the sequence of images comprising at least a first image generated at a first instant (t1), a second image generated at a second instant (t2) later than the first instant (t1), and a third image generated at a third instant (t3) later than the second instant (t2), the plurality of identical points relating to a plurality of repetitive patterns in each image of the sequence of images,
    calculate, for each of the plurality of identical points detected in the second image generated at the second instant (t2), a depth ($Z_{A1}(t1)$, $Z_{A2}(t1)$) at the first instant (t1) of a point in space corresponding to said each of the plurality of identical points in the second image,
    calculate, for each of the plurality of identical points detected in the third image generated at the third instant (t3), a depth ($Z_{A3}(t1)$, $Z_{A4}(t1)$) at the first instant (t1) of a point in space corresponding to said each of the plurality of identical points in the third image, and
    identify in the second image and in the third image, respective ones of each of the plurality of identical points corresponding to the points in space for which the calculated depth at the first instant (t1) is identical, these points in space representing respectively in the second image and in the third image one and the same real point.

7. The image processing module as claimed in claim 6, said image processing module being configured to calculate the depth ($Z_{A1}(t1)$, $Z_{A2}(t1)$) at the first instant of the point in space corresponding to said each of the plurality of identical points in the second image on the basis of a rotation matrix and of a translation vector between the first image and the second image.

8. The image processing module as claimed in claim 6, said image processing module being configured to calculate the depth ($Z_{A3}(t1)$, $Z_{A4}(t1)$) at the first instant of the point in space corresponding to said each of the plurality of identical points in the third image on the basis of a rotation matrix and of a translation vector between the first image and the third image.

9. The image processing module as claimed in claim 6, said image processing module being configured to store the depth ($Z_{A1}(t1)$, $Z_{A2}(t1)$) for each of the plurality of identical points detected in the second image of the sequence of images and the depth ($Z_{A3}(t1)$, $Z_{A4}(t1)$) for each of the plurality of identical points detected in the third image of the sequence of images.

10. An automotive vehicle comprising an image processing module as claimed in claim 6.

11. The image processing module as claimed in claim 7, said image processing module being configured to calculate the depth ($Z_{A3}(t1)$, $Z_{A4}(t1)$) at the first instant of the point in space corresponding to said each of the plurality of identical points in the third image on the basis of a rotation matrix and of a translation vector between the first image and the third image.

12. The method as claimed in claim 2, in which the depth ($Z_{A3}(t1)$, $Z_{A4}(t1)$) at the first instant of the point in space corresponding to said each of the plurality of identical points in the third image is calculated on the basis of a rotation matrix and of a translation vector between the first image and the third image.

\* \* \* \* \*